Patented Apr. 6, 1943

2,316,078

UNITED STATES PATENT OFFICE 2,316,078

LUBRICANT

Clarence M. Loane, Hammond, Ind., and James W. Gaynor, Chicago, Ill., assignors to Standard Oil Company, Chicago, Ill., a corporation of Indiana No Drawing. Application March 24, 1941, Serial No. 384,936

16 Claims. (Cl. 252—48)

This invention relates to lubricants and particularly to improvements in lubricating oil compositions intended for use in internal combustion engines such as automobile and Diesel engines under severe conditions wherein corrosion, piston ring sticking, cylinder wear, carbon, and varnish formation may be encountered.

Straight petroleum lubricants are effective within certain defined limits of engine operating conditions and when these limits are exceeded, such lubricants frequently fail to give the desired performance demanded of them. Since, in modern engines designed to give increased performance these limits are frequently exceeded, the use of straight mineral oils as lubricants produces undesirable conditions within the engine; thus varnish and carbon formation is excessive, and corrosion of improved hard metal alloy bearings is encountered.

It is an object of the present invention to provide a lubricant for internal combustion engines which will be effective in providing adequate lubrication for such engines.

It is a further object of the invention to provide a lubricant which will not be inducive to the formation of varnish and/or carbon. Another object of the invention is to provide a lubricant which will reduce engine wear and be non-corrosive to bearings. Other objects and advantages of the invention will become apparent as the description thereof proceeds.

We have discovered that an improved lubricant can be obtained by blending a lubricating oil with from about 0.001% to about 10% and preferably from about 0.01% to about 3% of the product obtained by reacting a phosphorus sulfide, such as $P_2S_3$, $P_2S_5$, $P_4S_7$, $P_4S_3$, etc. and preferably $P_2S_5$, with polymers of olefinic hydrocarbons, particularly low molecular weight mono-olefinic hydrocarbons.

The mono-olefin polymer to be treated may be the polymer resulting from the polymerization of low molecular weight iso-mono-olefins such as isobutylene and isoamylene and/or the co-polymers obtained by the polymerization of hydrocarbon mixtures containing low molecular weight iso-mono-olefins and normal mono-olefins such as those of less than six carbon atoms, and preferably those of four carbon atoms. The polymer may be obtained by the polymerization of these mono-olefins or mixed mono-olefins in the presence of catalysts such as sulfuric acid, phosphoric acid, or boron fluoride, aluminum chloride or other similar halide catalyst of the Friedel-Crafts type.

The polymers employed are preferably mono-olefin polymers, in which the molecular weight ranges from about 150 to about 50,000, or more, and preferably from about 500 to about 10,000. These polymers may be obtained, for example, by the polymerization in the liquid phase of iso-olefins such as isobutylene or hydrocarbon mixtures containing the same at a temperature of from about —80° F. to about 100° F., in the presence of a catalyst such as boron fluoride. In the preparation of these polymers we may employ, for example, liquid isobutylene or a hydrocarbon mixture containing isobutylene, butane, and butylene, recovered from petroleum gases especially those gases produced in the cracking of petroleum oils in the manufacture of gasoline. This light fraction may contain from about 10% to about 25% isobutylene, the remainder being principally butanes and normal butylene.

The preparation of low molecular weight polymers having molecular weights varying from about 100 to about 2,000, from the butane-butylene-isobutylene fraction may be carried out as follows: The hydrocarbon mixture containing 10% to 25% isobutylene is maintained under pressure sufficient to keep it in the liquid phase and cooled to a temperature of, for example, from about 0° F. to about 100° F., and preferably from about 0° F. to about 32° F. and from about 0.1% to about 2% boron fluoride, based upon the isobutylene content of the material treated, is added with vigorous agitation. Excessive rise in the temperature due to the heat of reaction may be avoided by efficient cooling. After the polymerization of the isobutylene together with a relatively minor amount of the normal olefins present, the reaction mass is neutralized and washed free of acidic substances arising from the catalyst, the oily layer is separated, and the polymer subsequently separated from the unreacted hydrocarbons by distillation. The polymer mixture so obtained, depending upon the temperature of reaction, varies in consistency from a light liquid to a viscous oily material and contains polymers having molecular weights ranging from about 100 to 2000. The polymers so obtained may be treated with $P_2S_5$ or other phosphorus sulfide or the polymer may be fractionated under reduced pressure into fractions of increasing molecular weights, for example, a tetramer fraction having a boiling point range between 470° F. and 475° F. and, for example, a distillate of about 150 seconds to about 200 seconds Saybolt at 100° F., or other desired fractions, and the fractions, or any one of them, reacted with a phosphorus sulfide. The bottoms resulting from the distillation of the polymer are well suited for the purpose of the present invention. Bottoms having Saybolt Universal viscosities at 210° F. of from about 50 seconds to about 10,000 seconds, and preferably above about 80 seconds, may be employed.

Another source of an olefinic polymer suitable for use in accordance with our invention is a fraction of the polymer obtained in the treatment of a gaseous hydrocarbon mixture containing isobutylene and normal butylene in the presence of phosphoric acid catalysts in the synthesis of isooctane. The polymer may be obtained by subjecting a gas mixture comprising less than $C_6$ hydrocarbons, and preferably $C_4$ olefins and paraffins, to temperatures of about 270° F. to 430° F., preferably about 300° F. to about 330° F., and at a pressure of from about 500 pounds per square inch to about 750 pounds per square inch, preferably about 600 pounds per square inch, in the presence of a catalyst such as phosphoric acid on kieselguhr, diatomaceous earth or aluminum-free clay. The mixed polymer obtained consists essentially of dimer, but contains in addition about 5–10% and usually 6–7% of heavy polymer comprising trimer, tetramer and still higher polymers. This heavy polymer fraction may be separated and treated with the sulfur compound of phosphorus as such or it may be still further fractionated to give about 10–15% bottoms, which comprise essentially a tetramer fraction and boil between about 400° F. and 520° F.

The phosphorus sulfide-olefin polymer reaction product may be obtained by reacting $P_2S_5$, for example, with a polymer of the type hereindescribed at a temperature of from about 200° F. to about 450° F., and preferably from about 300° F. to about 400° F. It is advantageous to maintain a non-oxidizing atmosphere, such as, for example, an atmosphere of nitrogen, above the reaction mixture. From about 1% to about 50% and preferably from about 5% to about 25% of the $P_2S_5$ may be used. Usually it is preferable to use an amount of $P_2S_5$ that will completely react with the polymer, so that no purification is necessary. However, excess $P_2S_5$ may be used and separated from the product after the heating is discontinued, by filtering or by diluting with a solvent such as hexane, filtering, and distilling off the solvent. The reaction product may be further treated by blowing with steam or nitrogen at an elevated temperature of from about 200° F. to about 600° F. to improve the odor thereof.

The $P_2S_5$-olefin polymer reaction products are very effective in increasing the oxidation stability of lubricating oils to which they are added and are also effective in inhibiting the corrosion of hard metal alloy bearings of the cadmium-silver and copper-lead type.

The effectiveness of these reaction products in improving the stability of a lubricating oil is demonstrated by the following tests in which the additive employed was the reaction product of $P_2S_5$ and an isobutylene polymer having a Saybolt viscosity at 210° F. of about 3000 seconds, obtained from a mixture of $C_4$ olefins and paraffins, as hereinbefore described, prepared by heating 25% of $P_2S_5$ with the polymer at a temperature of 300–310° F. for five hours. The product was then dissolved in hexane and filtered to remove excess $P_2S_5$ and the hexane subsequently removed by evaporation. The finished product contained 1.68% phosphorus and 3.0% sulfur. Two hundred fifty cc. of the oil to be tested was heated at 330° F.–332° F. in a 500 cc. glass beaker in the presence of five square inches of copper and ten square inches of iron. Four glass rods of six millimeter diameter were suspended in the oil which was stirred at about 1300 R. P. M. with a glass stirrer having a 40° blade pitch. At stated intervals oil samples were taken and sludge, acidity and viscosity values determined. The glass rods were also inspected for evidence of varnish formation thereon. Varnish values are based on the visual rating in which a glass rod free of any varnish is given a rating of 10 while a badly coated rod is given a rating of 1. Rods having appearances between these extremes are given intermediate values. An S. A. E. 20 lubricating oil containing 0.2% of this $P_2S_5$-polymer reaction product when tested in the above manner, gave the following results:

| Sample | Control | Control plus 0.2% $P_2S_5$-polymer reaction product |
| --- | --- | --- |
| Varnish: | | |
| 24 hrs | 8 | 10. |
| 48 hrs | 2–3 | 9. |
| Sludge: | | |
| 24 hrs | 30 mg./10 g. oil | 13 mg./10 g. oil. |
| 48 hrs | 762 mg./10 g. oil | 88 mg./10 g. oil. |
| Acidity: | | |
| 24 hrs | 3.7 mg. KOH g. oil | 0.8 mg. KOH g. oil |
| 48 hrs | 9.0 mg. KOH g. oil | 3.6 mg. KOH g. oil |
| Increase in Saybolt Vis. at 100° F., 48 hrs. | 607 seconds | 177 seconds. |

The effectiveness of the $P_2S_5$-isobutylene polymer reaction product in inhibiting corrosion to lead containing bearings is demonstrated by the following data. These data were obtained by placing lead strips and Cu-Pb bearings (1) in a typical motor oil and (2) in the same oil containing 2% of the $P_2S_5$-isobutylene polymer reaction product, and noting the loss in weight at stated intervals. In this test 250 cc. of the oil to be tested is placed in a 500 cc. glass beaker, the bearings suspended in the oil and the oil heated to 330° F. to 332° F. while being agitated by means of a stirrer. At intervals, the lead strip is removed from the oil, washed and weighed. After each determination of the corrosion loss, the strip is polished and reweighed before being replaced in the oil.

| | Lead strip corrosion loss, mgs./6 cm.² of surface | | | | | |
| --- | --- | --- | --- | --- | --- | --- |
| | 0–1 hrs. | 1–2 hrs. | 2–3 hrs. | 3–4 hrs. | 4–20 hrs. | Total 0–20 hrs. |
| Control | 0.7 | 4.8 | 89 | 115 | 1,915 | 2,125 |
| Control+2% $P_2S_5$—isobutylene polymer reaction product | 0.5 | 0.1 | 0.0 | 0.0 | 0.5 | 1.1 |

The data obtained in the above tests demonstrate the effectiveness of the $P_2S_5$-olefin polymer reaction product in improving the properties of lubricating oils.

The effectiveness of our improved lubricant is shown by the following data obtained in an engine test conducted in a standard six cylinder spark-ignition engine operating for sixty hours at 35 B. H. P. and 3000 R. P. M. and an oil sump temperature of about 285° F. An S. A. E. 20 motor oil containing 2% of $P_2S_5$-isobutylene polymer reaction product, and the same oil with no addition agent were subjected to this test. At the end of each test period the engine was dismantled and given a visual engine rating, in which a rating of 10 means that the engine parts had the same appearance as at the start of the test, while a rating of 1 means that the engine after the test showed very extensive deposits of varnish, sludge, etc. Engines having appearances between these extremes are given intermediate rating values. An engine lubricated with a good conventional motor oil for a sixty hour period usually merits a visual rating of about 5. In the tabulation below the visual rating and used oil inspection data are given.

ACCELERATED ENGINE TEST

*Visual engine ratings at end of 60 hours*

|  | Control | Control+2% $P_2S_5$-isobutylene polymer reaction product |
|---|---|---|
| Piston varnish | 5 | 8. |
| Sludge deposits | 6 | 10. |
| Ring belt carbon | 5 | 9. |
| Under crown carbon | 5 | 8. |
| Overall rating | 5.3 | 8.8. |
| Used oil inspection: | | |
| Saybolt viscosity at 210° F | 79.2 seconds | 60.9 seconds. |
| Acidity | 9.4 mg. KOH g. oil | 1.6 mg. KOH g. oil. |
| Carbon residue | 2.53% | 0.53%. |
| Sludge | 323 mg./10 g. oil | 43 mg./10 g. oil. |

The above data clearly show the marked improvement obtained by using small amounts of the phosphorus sulfide-mono-olefin polymer reaction product in motor oils.

While we have described the use of the phosphorus sulfide-iso-olefin polymer reaction product in lubricating oils, our invention is not limited to such use, since these reaction products may be employed in other petroleum products, such as insulating oils, white oils, technical white oils, greases, waxes and the like to increase the resistance thereof to oxidation, sludging and to inhibit the tendency thereof to corrode metals.

The reaction product per se and the process of preparing same are claimed in a co-pending application.

While we have described preferred embodiments of our invention, other modifications thereof may be made without departing from the scope and spirit of the invention, and we do not wish to limit our invention to the examples set forth herein except insofar as the same is defined by the following claims.

We claim:

1. A new composition of matter comprising a petroleum product and a small amount of the phosphorus and sulfur-containing, chlorine-free reaction product of a phosphorus sulfide and a polymer of a mono-olefinic hydrocarbon of less than six carbon atoms said polymer having a molecular weight above about 500.

2. A new composition of matter comprising a petroleum product and a small amount of the phosphorus and sulfur-containg, chlorine-free reaction product of a phosphorus sulfide and a co-polymer of an iso-mono-olefin and a normal mono-olefin, said olefins having less than six carbon atoms, and said copolymer having a molecular weight above about 500.

3. A new composition of matter comprising a petroleum product and about .001% to about 10% of the phosphorus and sulfur-containing, chlorine-free reaction product of $P_2S_5$ and an isobutylene polymer, said isobutylene polymer being obtained by polymerizing isobutylene in the presence of a catalyst of the Friedel-Crafts type and having a molecular weight above about 500.

4. An improved lubricant comprising a mineral lubricating oil and a small amount of the phosphorus and sulfur-containing, chlorine-free reaction product of phosphorus sulfide and a polymer of an iso-mono-olefinic hydrocarbon of less than six carbon atoms said polymer having a molecular weight above about 500.

5. An improved lubricant comprising a mineral lubricating oil and a small amount of the phosphorus and sulfur-containing, chlorine-free reaction product of a phosphorus sulfide and a co-polymer of an iso-mono-olefin and a normal mono-olefin said olefins having less than six carbon atoms, and said co-polymer having a molecular weight above about 500.

6. An improved lubricant comprising a lubricating oil and from about .001% to about 10% of the phosphorus and sulfur-containing, chlorine-free product obtained by reacting a phosphorus sulfide and an isobutylene polymer, said isobutylene polymer being obtained from isobutylene polymerized in the presence of a catalyst of the Friedel-Crafts type and having a molecular weight above about 500.

7. An improved lubricant as described in claim 6 in which the catalyst is boron fluoride.

8. The method of inhibiting the deterioration of a mineral lubricating oil in internal combustion engines comprising adding to a mineral lubricating oil normally susceptible to deterioration in internal combustion engines during use, a small amount of the phosphorus and sulfur-containing, chlorine-free product obtained by reacting a phosphorus sulfide and a polymer having a molecular weight above about 500 of a mono-olefinic hydrocarbon of less than six carbon atoms.

9. The method of inhibiting the deterioration of a mineral lubricating oil in internal combustion engines comprising adding to a mineral lubricating oil normally susceptible to deterioration in internal combustion engines during use, a small amount of the phosphorus and sulfur-containing, chloride-free product obtained by reacting a phosphorus sulfide and an isobutylene polymer, said isobutylene polymer being obtained from isobutylene polymerized at a temperature of about 0° F. to about 100° F. in the presence of boron fluoride having a molecular weight above about 500.

10. The method of inhibiting the deterioration of a mineral lubricating oil in internal combustion engines during use comprising adding to a mineral lubricating oil normally susceptible to deterioration in internal combustion engines during use from about .001% to about 10% of the phosphorus and sulfur-containing, chlorine-free product obtained by reacting $P_2S_5$ with an isobutylene polymer having a molecular weight above about 500 obtained from isobutylene polymerized at a temperature of about 32° F. in the presence of boron fluoride.

11. The method of inhibiting the formation of sludge, carbon and varnish in an internal combustion engine lubricated with a mineral lubricating oil, comprising adding to said mineral lubricating oil a small amount of the phosphorus and sulfur-containing, chlorine-free product obtained by reacting a phosphorus sulfide and a polymer having a molecular weight above about 500 of a mono-olefinic hydrocarbon of less than six carbon atoms.

12. An improved lubricant comprising a hydrocarbon oil and a small amount of the phosphorus and sulfur-containing, chlorine-free reaction product of a phosphorus sulfide and a polymer having a molecular weight above about 500 of a mono-olefinic hydrocarbon of less than six carbon atoms.

13. A new composition of matter comprising a hydrocarbon oil and a phosphorus and sulfur-containing, chlorine-free reaction product of a phosphorus sulfide and a polymer having a molecular weight above about 500 of a mono-olefinic hydrocarbon, of less than six carbon atoms.

14. A new composition of matter comprising a hydrocarbon oil and a phosphorus and sulfur-containing, chlorine-free, reaction product of a phosphorus sulfide and a polymer having a molecular weight above about 500 of an iso-mono-olefinic hydrocarbon of less than six carbon atoms.

15. A new composition of matter comprising a hydrocarbon oil and a phosphorus and sulfur-containing, chlorine-free, reaction product of a phosphorus sulfide and an isobutylene polymer having a molecular weight above about 500.

16. A new composition of matter comprising a hydrocarbon oil and a phosphorus and sulfur-containing, chlorine-free, reaction product of a phosphorus pentasulfide and an isobutylene polymer having a molecular weight above about 500.

CLARENCE M. LOANE.
JAMES W. GAYNOR.